United States Patent [19]

Duncan

[11] Patent Number: 4,582,752

[45] Date of Patent: Apr. 15, 1986

[54] HEAT SHRINKABLE, LUSTROUS SATIN APPEARING, OPAQUE FILM COMPOSITIONS

[75] Inventor: Gary L. Duncan, Fairport, N.Y.

[73] Assignee: Mobil Oil Corporation, New York, N.Y.

[21] Appl. No.: 753,849

[22] Filed: Jul. 11, 1985

[51] Int. Cl.$^4$ .............................................. B32B 3/26
[52] U.S. Cl. .............................. 428/317.9; 428/313.3; 428/315.5; 428/323; 428/910; 428/913
[58] Field of Search ............... 428/313.3, 313.5, 313.9, 428/314.4, 314.8, 315.5, 315.7, 315.9, 317.9, 323, 910, 913

[56] References Cited

U.S. PATENT DOCUMENTS

| | | | |
|---|---|---|---|
| 3,808,304 | 4/1974 | Schirmer | 264/290.2 |
| 4,188,350 | 2/1980 | Vicik et al. | 525/232 |
| 4,194,039 | 3/1980 | Mueller | 428/910 |
| 4,377,616 | 3/1983 | Ashcraft et al. | 428/315.7 |
| 4,390,385 | 6/1983 | Ferguson et al. | 156/229 |
| 4,448,792 | 5/1984 | Schirmer | 426/113 |
| 4,496,620 | 1/1985 | Park et al. | 428/910 |

*Primary Examiner*—William J. Van Balen
*Attorney, Agent, or Firm*—Alexander J. McKillop; Michael G. Gilman; Charles J. Speciale

[57] ABSTRACT

An opaque, biaxially oriented heat shrinkable polymeric film structure of lustrous satin appearance is described which comprises:

(a) a heat shrinkable thermoplastic polymer matrix core layer within which is located a strata of voids; positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle, at least approximating a corresponding cross-sectional dimension of said void; the population of voids in said core and the thickness of said core being such as to cause a degree of opacity of less than 70% light transmission; and, (b) at least one void-free heat shrinkable thermoplastic skin layer affixed to a surface of core layer (a), said skin layer(s) being of a thickness such that the outer surfaces thereof do not, at least substantially, manifest the surface irregularities of said core layer.

9 Claims, No Drawings

HEAT SHRINKABLE, LUSTROUS SATIN APPEARING, OPAQUE FILM COMPOSITIONS

BACKGROUND OF THE INVENTION

This invention relates to the field of polymer films and, more particularly, to a heat shrinkable biaxially oriented laminated polymer film.

As noted in U.S. Pat. No. 4,194,039, the polyolefins and polyvinyl chlorides can be considered to be the two major families of synthetic resins from which most of the commercially available shrink films for wrapping purposes are manufactured. Other synthetic resins which are useful for the fabrication of shrink films include various ionomers, polyesters, polystyrenes and polyvinylidene chlorides. The shrinkable polyolefins currently on the market are for the most part monolayer films which include both cross-linked and uncross-linked oriented polyethylene, oriented polypropylene, and oriented ethylene-propylene copolymers. The polyvinyl chloride (PVC) shrink films are monolayer films consisting of a variety of formulations of polyvinyl chloride.

As explained in U.S. Pat. No. 4,194,039, a shrink film's distinguishing characteristic is its ability upon exposure to some level of heat to shrink or, if restrained, to create shrink tension within the film. This ability is activated by the packager when the wrapped product is passed through a hot air or hot water shrink tunnel. The resulting shrinkage of the film results in an aesthetically pleasing transparent wrapping which conforms to the contour of the product while providing the usual functions required of packaging materials such as protection of the product from loss of components, pilferage, or damage due to handling and shipment. Typical items wrapped in PVC or polyolefin shrink films are toys, games, sporting goods, stationery, greeting cards, hardware and household products, office supplies and forms, foods, phonograph records, and industrial parts.

The manufacture of shrink films requires relatively sophisticated equipment including extrusion lines with "racking" capability, irradiation units when cross-linking is desired, tenter frames, mechanical centerfolders, and slitters. "Racking" or "tenter framing" are conventional orientation processes which cause the film to be stretched in the cross or transverse direction and in the longitudinal or machine direction. The films are usually heated to their orientation temperature range which varies with different polymers but is usually above room temperature and below the polymer's melting temperature. After being stretched, the film is rapidly cooled to quench it thus freezing the molecules of the film in their oriented state. Upon heating, the orientation stresses are relaxed and the film will begin to shrink back to its original, unoriented dimension.

For more detailed disclosures of heat shrinkable films, reference may be had to aforesaid U.S. Pat. No. 4,194,039 as well as U.S. Pat. Nos. 3,808,304; 4,188,350; 4,448,792; and 4,390,385.

U.S. Pat. No. 4,377,616, the contents of which are incorporated by reference herein, discloses an opaque biaxially oriented polymer film structure comprising a thermoplastic polymer matrix core layer possessing numerous voids, a substantial number of which contain at least one spherical void-initiating particle, and transparent thermoplastic skin layers adhering to the surfaces of the core layer. The unique structure of the core layer imparts a much higher degree of opacity, possibly due to the effects of light scattering, than that possible by the use of opacifying pigment alone. There is no disclosure or suggestion in U.S. Pat. No. 4,377,616, however, of fabricating such core layer and skin layers from heat shrinkable thermoplastic resin.

SUMMARY OF THE INVENTION

It is an object of the present invention to impart heat shrinking properties to a polymer film structure possessing opacifying voids.

It is a particular object of the invention to fabricate the opaque polymer film structure of U.S. Pat. No. 4,377,616 from heat shrinkable blends of isotactic polypropylene and biaxially oriented thermoplastic resins.

In accordance with the foregoing objects, there is provided a heat shrinkable, lustrous satin appearing, opaque film structure which comprises:

(a) a heat shrinkable thermoplastic polymer matrix core layer within which is located a strata of voids; positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle, at least approximating a corresponding cross-sectional dimension of said void; the population of voids in said core and the thickness of said core being such as to cause a degree of opacity of less than 70% light transmission; and, (b) at least one void-free heat shrinkable thermoplastic skin layer affixed to a surface of core layer (a), said skin layer(s) being of a thickness such that the outer surfaces thereof do not, at least substantially, manifest the surface irregularities of said core layer.

This film is produced in accordance with a modification of the process described in U.S. Pat. No. 4,377,616 which comprises:

mixing a first heat shrinkable thermoplastic polymeric material with a second material incompatible with said first material to form a core mixture, said second material being of a higher melting point or having a higher glass transition temperature than said first material;

heating the core mixture to a temperature at least above the melting point of said first material;

dispersing said second material uniformly throughout the molten first material in the form of microspheres;

extruding the core mixture in the form of a core layer;

adherently applying heat shrinkable thermoplastic skin film(s) to the surface(s) of said core layer in a thickness which will not ultimately manifest surface irregularities of said core layer;

biaxially orienting the film structure at a temperature and to an extent to form opacifying voids in said core layer so as to optimize the degree of opacity, enhance the physical characteristics and impart a lustrous satin appearance to said film structure.

DESCRIPTION OF THE PREFERRED EMBODIMENTS

In order to achieve the unique lustrous satin appearance of the heat shrinkable film structure of the present invention, it is important that a particular thickness relationship exist between the thickness dimension of the heat shrinkable core (a) and the thickness dimension of the heat shrinkable skin layer (b) which can be transparent or pigmented for further augmented opacity. It is preferred that the core thickness be from about 30 to about 85% of the overall structure. This, in combination with the population and configuration of the voids in a structure of at least about 0.5 mils thick, will materially contribute to the overall degree of opacity of the structure. Likewise, by maintaining the heat shrinkable skin thickness within a particular range in relation to the overall structure and to the thickness of the heat shrinkable core layer, the overall combination results in the unique lustrous satin appearance of the heat shrinkable film combination. It is preferred that the skin thickness (or combined skin thickness where two such layers are affixed to each side of the core layer as in the preferred laminate structure) be about 15 to about 70% of the overall film structure. It is important that the skin layer(s) be sufficiently thick so that the outer surfaces thereof do not manifest the irregularities or surface projections of the core material. If this were the case, the lustrous appearance of the satin finish would be materially lessened.

It is preferred that the average diameter of the void-initiating particles be from about 0.1 to about 10 microns. These particles should be spherical in shape so as to initiate a void of unusual regularity and orientation in a stratified relationship throughout the thermoplastic polymer matrix material after biaxial orientation of the system. This does not mean that every void is the same size. It means that, generally speaking, each void tends to be of like shape even though it may vary in dimensions from those of other voids because all of the voids are initiated by a spherical particle. Ideally, the voids assume a shape defined by two opposed and edge-contacting concave disks.

Optimum characteristics of opacity and satin-like appearance are obtained when the two average major void dimensions are greater than about 30 microns.

The void-initiating particle material, as indicated above, should be incompatible with the core material, at least at the temperature of biaxial orientation.

The core has been described above as being a thermoplastic polymer matrix material within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of one or more spherical particles, the particle(s) may contribute little else to the system. This is because its refractive index can be close enough to that of the matrix material that it makes no contribution to opacity. When this is the case, the opacity is principally a function of the light scattering affect which occurs because of the existence of the voids in the system. The opacity of the system can be somewhat enhanced by the inclusion therein of an opacifying pigment dispersed throughout. A particularly preferred proportion of pigment in the core layer can be from about 1 to about 3% by weight of the core. The pigment material is present in such a particle size and shape that it does not, at least in any material sense, contribute any void initiation by itself. The optional presence of the opacifying pigment contributes perhaps 3 to 8% to the degree of opacity of the system.

A typical void of the core is defined as having major dimensions X and Y and minor dimension Z, where dimension X is aligned with machine direction orientation, dimension Y is aligned with transverse direction orientation and dimension Z approximately corresponds to the cross-sectional dimension of the spherical particle which initiated the void.

It is a necessary part of the present invention that orientation conditions be such that the X and Y dimensions of the voids of the core be major dimensions in comparison to the Z dimension. Thus, while the Z dimension generally approximates the cross-sectional dimension of the spherical particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction or stretching, the temperature conditions must be such as to permit these major dimensions to form without any destruction of the voids in any of its dimensions. The voids are particularly vulnerable to destruction during sequential orientation if the stretching forces will tend to cause internal shredding and void splitting. This leads to a complete loss of control over the integrity of the individual closed voids, and the consequent integrity of the matrix polymer. Thus, one skilled in the art, following the present general guidelines can orient at a temperature and to a degree which will yield X and Y dimensions approaching a maximum without causing at least any substantial splitting, shredding or overall lack of void and matrix integrity.

By way of illustration, room temperature biaxial orientation of a polypropylene matrix heat shrinkable layer (a) containing nylon spheres of the size and amount contemplated herein will not produce the claimed structure. Either void splitting will occur or voids of insignificant size will result. Polypropylene must be oriented at a temperature which happens to be significantly higher than its glass transition temperature. The temperature conditions must permit X and Y to be at least several multiples of the Z dimension without void splitting at least to any significant degree. If this is accomplished, optimum physical characteristics, including low water vapor transmission rates and a high degree of light scattering, are obtained without void splitting or film fibrillating.

As indicated above, the matrix polymer and the void initiating particle must be incompatible and this term is used in the sense that the materials are two distinct phases. The spherical void initiating particles constitute a dispersed phase throughout the lower melting polymer which polymer will, ultimately, upon orientation, become a void filled matrix with the spherical particles positioned somewhere in the voids.

As a result of the biaxial orientation of the film structure described herein, in addition to opacifying the core layer of the structure, the orientation improves other physical properties of the composite layers such as, flex-cracking resistance, Elmendorff tear strength, elongation, tensile strength, impact strength and cold strength properties. In addition to this, an extraordinary, rich looking, lustrous satin appearance is imparted to the heat shrinkable film structure. This appearance is not seen in the absence of the heat shrinkable skin layer or if the skin layer is too thin or otherwise substantially reveals the surface imperfections of core layer (a). The resulting heat shrinkable film can have, in addition to a rich, high quality appearance, low water vapor transmission rate characteristics and low oxygen transmission rate characteristics. This makes the film ideally suited for packaging food products, including liquids. The film also has attractive utility as a decorative wrap material.

It is believed that because of the comparative sphericity of the void-initiating particles, the voids are closed cells. This means that there is virtually no path open from one side of the core to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape. When a polymeric material is contemplated as the void-initiating particle, it can be a polymer which is comelted with the polymer of the matrix or core. In this case, it is necessary for it to have a sufficiently higher melting point than the core polymer and be incompatible and capable of assuming a dispersed phase of small spherical particles as the temperature of the co-melted mix is reduced. It is also contemplated that the void initiating particles can be preformed and then uniformly dispersed into a melt of, e.g., polypropylene. This has the advantage of not having to subject the matrix polymer to the temperature of a much higher melting polymer. In this manner, any thermal degradation of the matrix polymer is avoided.

It is believed that because of the number, the shape and the orientation strata-wise of matrix voids, a significantly enhanced light scattering effect is obtained by virtue of the present invention. This effect is further enhanced or magnified by the use of the two transparent or pigmented skin layer(s) of the size relationship mentioned above.

When preformed spheres are employed, it is the shape and size of the sphere that is important rather than the chemical nature of the material, per se. Thus, solid or hollow organic or inorganic spheres of any type can be employed. Interesting effects can be achieved by the use of spheres of different colors. Since statistically each void has approximately one sphere somewhere within the void, interesting and pleasing color and/or reflectance effects can be imparted to the overall layer structure by use of spheres of different color absorption or reflectance. The light scattered in a particular void is additionally either absorbed or reflected by the void initiating sphere and a separate color contribution is made to the light scattering in each void.

Examples of thermoplastic resins which can be used as the dispersed phase within the matrix material are the polyamides or nylons of commerce, certain polyesters such as polyethylene terephthalate acetals, acrylic resins, etc. Inorganic materials include solid or hollow preformed glass spheres, metal beads or spheres, ceramic spheres, etc. In fact, any material which can be formed into spheres without causing thermal degradation to the core material is contemplated.

By the technique of the present invention, light transmission through the heat shrinkable film structures contemplated herein can be reduced to as low as about 16%. This would be true in a film having an overall thickness of at least 1.5 mils where the core portion is at least 60% and the thickness of the skin layer(s) makes up the remaining 40% thickness.

While the preferred particle size of the sphere is to be from about 0.1 to about 10 microns, it is particularly preferred that the particle size range from about 0.75 to about 2 microns. The void initiating particles can be present in up to about 20% by weight of core layer (a) prior to orientation, a preferred range being from 2 to about 7 percent by weight.

For convenience and more precise control of the formulation and character of the core layer, a master batch technique can be employed either in the case of forming the spherical particles in situ or in adding preformed spheres to the molten core matrix material. After the formation of a master batch, appropriate dilution of this system can be made by adding additional thermoplastic core matrix material until the desired proportions are obtained.

Any of the coextrudable, biaxially orientable heat shrinkable film-forming resins known in the art can be used to provide the core and skin film(s) of the film structure of the present invention. The same or different heat-shrinkable resins can be used to prepare core layer (a) and skin layer(s) (b) of the laminate structure herein.

For example, the heat shrinkable films formed from the polypropylene/polybutylene-1 homogeneous blends of U.S. Pat. No. 3,808,304, the disclosure of which is incorporated by reference herein, can be used to fabricate both the core and skin layers of the present laminates. These blends contain from about 30 to 90 weight parts of polypropylene, and correspondingly, from about 70 to about 10 weight parts of polybutene-1. Preferred ranges for these polymers are 30 to 50 weight parts polypropylene and 70 to 50 weight parts polybutene-1. It is preferred that isotactic polypropylene and polybutene-1 be employed. Preferably, the isotactic content of both the polybutene-1 and the polypropylene is at least 93%, preferably about 97 to 100%, as measured by the polymer's insolubility in boiling n-heptane for polypropylene or boiling diethylether for polybutene-1. The propylene and polybutene-1 may be admixed by any suitable means to form a homogeneous blend, such as dry mixing, solution mixing, or mixing the two polymers together while in a molten state or combinations thereof.

Alternatively as in the multi-layer polyolefin shrink film of U.S. Pat. No. 4,114,039, the disclosure of which is incorporated by reference herein, core layer (a) can be obtained from a heat shrinkable blend of ethylene-vinyl acetate copolymer with ethylene-butylene copolymer and each of two skin layers ($b_1$) and ($b_2$) affixed to the surface of said core layer can be obtained from an ethylene-propylene copolymer. A preferred core layer comprises a blend of approximately 80% by weight of ethylene-vinyl acetate copolymer having approximately 12% by weight vinyl acetate content and a melt flow of about 0.25 with about 20% by weight of an ethylene-butylene copolymer having up to 5% by weight of ethylene and a melt flow of about 2.0. The preferred blend proportion range is 70% to 90% wt. ethylene-vinyl acetate copolymer with 30% to 10% wt. of polybutylene or ethylenebutylene copolymer. The vinyl acetate content in the ethylene-vinyl acetate copolymer may vary from 8% to 20% wt. with a preferred melt flow of less than 1.0 although melt flows up to 5.0 are usable. The heat shrinkable skin layers ($b_1$) and ($b_2$) are preferably of identical composition, each comprising ethylene-propylene copolymer wherein the ethylene content is 3.5 to 4.0% by weight and the melt flow is in the range from about 1.0 to 4.0. Polypropylene may also be used as the skin or auxiliary layer material.

Additives, such as fillers, antioxidants, pigments, antistatic agents, slip agents, antitack agents, and the like, can be incorporated in the foregoing heat shrinkable polymers, either before, after or during the blending operation.

It is preferred that the heat shrinkable core material and the heat shrinkable skin material be coextruded. Thereafter, biaxial orientation is carried out to an extent and at a temperature calculated to obtain the maximum degree of opacity without any significant sacrifice in the physical characteristics, including appearance, of the film structure. Obviously, as the materials employed change, the conditions of biaxial orientation will change. By way of exemplification, when employing a 50/50 weight part blend of polypropylene/polybutylene-1 as the material of the heat shrinkable core matrix and when employing nylon-6 as the void initiating spheres, a machine direction orientation of from about 4 to 8 times and a transverse direction orientation of from about 4 to 8 times, at a drawing temperature of from 100° C. to 160° C. can be used to provide a biaxially oriented heat shrinkable film of from 0.7 to 3 mils overall thickness.

If desired, the exposed surface of one of the skin layers can be treated in a known and conventional manner by corona discharge to improve its receptivity to inks.

The following example is illustrative of the process by which the film structure of this invention can be obtained.

EXAMPLE

A 40/60 weight part mixture of isotactic polypropylene and isotactic polybutene-1 containing nylon-6 (7 parts, MP 225° C.) is melted/blended in an extruder provided with a screw of L/D ratio of 20/1. A second extruder in association with this first mentioned extruder is supplied with the same mixture of isotactic polypropylene and isotactic polybutene-1 as the first extruder. A melt coextrusion is carried out while maintaining the cylinder of the core material at a temperature ranging from 190° C. to 220° C. The polypropylene/polybutene-1 blend to be extruded as skin layers ($b_1$) and ($b_2$) is maintained at a temperature of 220° C. A heat shrinkable film structure is coextruded with a core thickness 40% of the total extruded thickness. The skin layers are each approximately 30% of the total thickness. The unoriented film measures approximately 40 mils in thickness. This sheet is subsequently oriented seven by seven and one-half times using a commercially available sequential biaxially orienting apparatus. The MD orientation temperature is about 105° C. and the TD orientation is about 135° C. The resulting 1.9 mil heat shrinkable film has a lustrous satin appearance.

What is claimed is:
1. An opaque, biaxially oriented polymeric film structure of lustrous satin appearance which comprises:
    (a) a heat shrinkable thermoplastic polymer matrix core layer within which is located a strata of voids; positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle, at least approximating a corresponding cross-sectional dimension of said void; the population of voids in said core and the thickness of said core being such as to cause a degree of opacity of less than 70% light transmission; and,
    (b) at least one void-free heat shrinkable thermoplastic skin layer affixed to a surface of core layer (a), said skin layer(s) being of a thickness such that the outer surfaces thereof do not, at least substantially, manifest the surface irregularities of said core layer.
2. The structure of claim 1 wherein said spherical void-initiating particle is an inorganic material.
3. The film structure of claim 1 wherein said void-initiating spherical particle is an organic material.
4. The film structure of claim 3 wherein said organic material is a polymer.
5. The structure of claim 1 wherein said structure is a coextruded structure.
6. The structure of claim 1 wherein the thickness of core layer (a) is from about 30 to about 85% of said structure.
7. The structure of claim 1 wherein the core and skin layer(s) are obtained from a homogeneous blend of from about 30 to about 90 weight parts polypropylene and, correspondingly, from about 70 to 10 weight parts of polybutylene-1.
8. The structure of claim 1 wherein core layer (a) is a blend of ethylene-vinyl acetate copolymer and ethylenebutylene copolymer to which there is affixed on both surfaces thereof skin layers ($b_1$) and ($b_2$) made up of ethylene-propylene copolymer.
9. The structure of claim 1 further including a water vapor transmission barrier layer affixed to core layer (a) and/or skin layer (b).

* * * * *